United States Patent [19]
Masaki

[11] 3,908,366
[45] Sept. 30, 1975

[54] MISFIRING DETECTOR FOR INTERNAL COMBUSTION ENGINES

[75] Inventor: Kenji Masaki, Yokohama, Japan

[73] Assignee: Nissan Motor Company Limited, Yokohama, Japan

[22] Filed: June 15, 1973

[21] Appl. No.: 370,369

[30] Foreign Application Priority Data
June 17, 1972  Japan................................ 47-60845
June 17, 1972  Japan................................ 47-60846

[52] U.S. Cl. ...................... 60/277; 60/288; 60/289; 73/117.3; 73/346; 324/15; 340/228.1
[51] Int. Cl.² ........................................ F02B 75/10
[58] Field of Search.................... 60/277, 288, 289; 73/117.3, 35, 116, 346; 324/15, 16; 328/120; 340/228.1

[56] References Cited
UNITED STATES PATENTS

| | | | |
|---|---|---|---|
| 2,721,890 | 10/1955 | Malick | 123/117 R |
| 3,126,733 | 3/1964 | Heigl | 73/35 |
| 3,203,168 | 8/1965 | Thomas | 60/286 |
| 3,289,462 | 12/1966 | Wostl | 324/15 |
| 3,472,068 | 10/1969 | List | 73/346 |
| 3,581,490 | 6/1971 | Morris | 60/288 |
| 3,738,108 | 6/1973 | Goto | 60/277 |

*Primary Examiner*—Douglas Hart

[57] ABSTRACT

A misfiring detector for detecting a misfire occurring in an internal combustion engine which comprises a gas current pulse generator which has electrodes forming an ion-gap for generating gas current pulse signal when a high temperature burned gas is emitted through the ion-gap from the engine, an engine speed sensor for generating an engine speed pulse signal with a repetition rate proportional to the speed of the engine, and an electronic computing means responsive to the gas current pulse signal and the engine speed pulse signal to produce an electric output signal representing the occurrence of the misfire when the ratio of the number of the gas current pulse signal to that of the engine speed pulse signal is less than a predetermined value. The gas current pulse generator is disposed in an exhaust manifold in the vicinity of an exhaust port as adjacently as possible. The misfiring detector further comprises an indicator for indicating the occurrence of the misfire and a storing means for storing the misfiring condition. Furthermore, disclosed herein is a protection system for preventing an exhaust gas purifying means from being destroyed by unburned gas caused by the misfire through utilization of the above misfiring detector. The protection is accomplished by shutting off the unburned gas and/or a secondary air drawn into the exhaust gas purifying means in the event that the misfire occurs in the engine, or by controlling an amount of the secondary air.

9 Claims, 4 Drawing Figures

(A) ENGINE SPEED PULSE SIGNAL $S_n$ (B) GAS CURRENT PULSE SIGNAL $S_g$ (C) FREQUENCY OF MISFIRE $M$

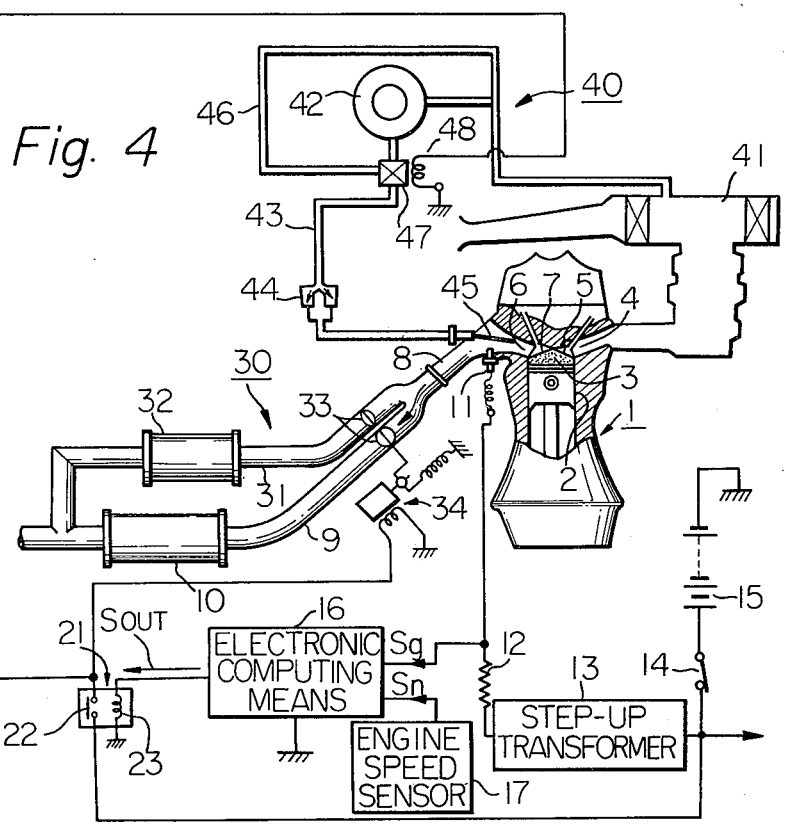
Fig. 4
Fig. 3
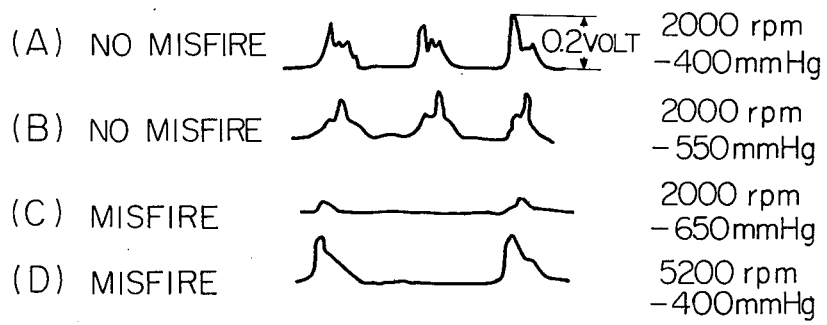
(A) NO MISFIRE  0.2 VOLT  2000 rpm −400 mmHg
(B) NO MISFIRE  2000 rpm −550 mmHg
(C) MISFIRE  2000 rpm −650 mmHg
(D) MISFIRE  5200 rpm −400 mmHg

MISFIRING DETECTOR FOR INTERNAL COMBUSTION ENGINES

The present invention relates in general to an internal combustion engine and, more particularly to a misfiring detector for electronically detecting a misfire occurring in an internal combustion engine especially for an automobile and a protective system for preventing an exhaust gas purifying means from being destroyed by unburned engine exhaust gas caused by the misfire by utilizing the misfiring detector.

In the internal combustion technology, it is well known that a high temperature exhaust gas which is completely burned in a combustion chamber of an internal combustion engine is ionized, so that if an ion-gap is formed in the combustion chamber, the ion-gap yields the so-called ionization current or gas current when the completely burned exhaust gas passes through the ion-gap. In other words, this yield of the gas current means that the exhaust gas has been completely burned in the combustion chamber of the engine. Accordingly, it has been previously tried to electronically detect a misfire occurring the combustion chamber of the engine by means of such a gas current. Upon this, it has been considered in the prior art that the ion-gap should be formed in the combustion chamber. However, the experiments conducted by the inventor show that it is possible to collect the gas current enough to detect a misfire occurring in the combustion chamber if the ion-gap is formed in an exhaust manifold in the vicinity of an exhaust port as adjacently as possible. Practically, the ion-gap is not formed in the exhaust manifold per se, but the exhaust manifold is provided with electrodes having formed therebetween an ion-gap.

Thus, in accordance with the present invention, an improved misfiring detector for detecting a misfire occurring in an internal combustion engine is provided in which the detection is carried out by collecting such a gas current from an ion-gap formed between electrodes to produce an electric gas current pulse signal when no misfire occurs in the engine, by sensing an engine speed to produce an engine speed pulse signal with a repetition rate proportional to the speed of the engine, and by comparing the gas current pulse signal with the engine speed pulse signal to produce an output signal representing the occurrence of the misfire when the ratio of the number of the gas current pulse signal to that of the engine speed pulse signal is less than a predetermined value. As mentioned above, the electrodes having formed therebetween an ion-gap are disposed in an exhaust manifold in the vicinity of an exhaust port as adjacently as possible.

Now, the extent of misfire may be judged from the rate of the frequency in occurrence of misfire per unit time in relation to the number of revolutions of the engine. For example, if the misfire occurs successively in only one combustion chamber of an engine having four combustion chambers, the rate or percentage of misfire occurring in the engine is 25%. If the misfire occurs in the one combustion chamber once per five revolutions of the engine, the rate or percentage of misfire occurring in the engine is 5%. The experiments conducted by the inventor show that, if the rate of misfire occurring in the engine is less than 5%, the misfire is not worth due consideration. Thus, the misfiring detector of the present invention is so designed as to indicate the occurrence of misfire only when the rate of misfire occurring in the engine is more than 5%.

On the other hand, disclosed herein is also a protective system for preventing an exhaust gas purifying means from being destroyed or damaged by unburned gas caused by a misfire through utilization of the misfiring detector mentioned above.

As is well known, an exhaust gas purifying means such as a catalytic converter or a thermal reactor is apt to be damaged by unburned gas containing unburned hydrocarbons (HC) and carbonmonoxides (CO) emitted from a combustion chamber of an internal combustion engine. Where the exhaust gas purifying means is a catalytic converter, it is overheated by an excessive exothermic reaction of the catalytic substance caused by the unburned hydrocarbons thus emitted and a secondary air supplied from a secondary air supply system. It is, accordingly, possible to prevent such overheating as would destroy the catalytic converter by shutting off the unburned gas and/or the secondary air introduced into the catalytic converter in the event that a misfire occurs in the engine, or by controlling an amount of the secondary air introduced into the catalytic converter to the extent that the exothermic reaction of the catalytic substance does not invite such overheating as would destroy the catalytic converter. On the other hand, where the exhaust gas purifying means is a thermal reactor, it is also overheated by an exothermic reaction caused by the secondary air and unburned gas, so that it is possible to protect the thermal reactor by shutting off the unburned gas and/or the secondary air introduced into the thermal reactor in the event that a misfire occurs in the engine, or by controlling an amount of the secondary air introduced into the thermal reactor to the extent that the exothermic reaction does not invite such overheating as would destroy the thermal reactor.

A question arises hereupon as to the extent of misfire causing the emission of the unburned gas which would destroy the exhaust gas purifying means. As described hereinbefore, it has been found from the experiments conducted by the inventor that they are not destroyed if the rate or percentage of misfire occurring in the engine is less than 5%. Accordingly, the protective system for the exhaust gas purifying means of the present invention is so designed as to indicate the overheat of the exhaust gas purifying means only when the rate of misfire occurring in the engine is more than 5%.

Thus, in accordance with the present invention, an improved protective system for an exhaust gas purifying means is provided in which the protection is carried out by shutting off unburned gas containing unburned hydrocarbons and carbon-monoxides emitted from a combustion chamber of an engine and a secondary air supplied from a secondary air supply system in the event that a misfire occurs in the engine so as to prevent the unburned gas from being introduced the exhaust gas purifying means, or by controlling an amount of the secondary air to the extent that an excessive exothermic reaction of the exhaust gas purifying means caused by the secondary air does not invite the overheating as would destroy the exhaust gas purifying means.

It is, therefore, a principal object of the present invention to provide an improved misfiring detector for electronically detecting a misfire occurring in an internal combustion engine by means of ionization current or gas current.

Another object of the present invention is to provide an improved misfiring detector which is capable of indicating the occurrence of a misfire to the operator.

Still another object of the present invention is to provide an improved misfiring detector which is capable of storing a misfiring condition.

Still another object of the present invention is to provide an improved misfiring detector which is simple in construction and economical to manufacture.

A further object of the present invention is to provide an improved misfiring detector which is highly reliable in operation and can easily installed on various engines.

Still a further object of the present invention is to provide an improved protective system for preventing an exhaust gas purifying means from being destroyed by unburned engine exhaust gas caused by a misfire occurring in an internal combustion engine.

Still a further object of the present invention is to provide an improved protective system for an exhaust gas purifying means by utilizing the misfiring detector mentioned above.

These and other objects and advantages of the present invention will become apparent from the following detailed description taken in conjunction with accompanying drawings in which like reference numerals are assigned to corresponding parts and elements and in which:

FIG. 3 is an explanatory view showing some examples of pulse waveforms of ionization current or gas current appearing at an ion-gap of a gas current pulse generator shown in FIG. 1; and FIG. 4 is a schematic sectional view of an overall configuration of a protective system for an exhaust gas purifying means which includes the misfiring detector shown diagramatically in FIG. 1.

Figure 1:
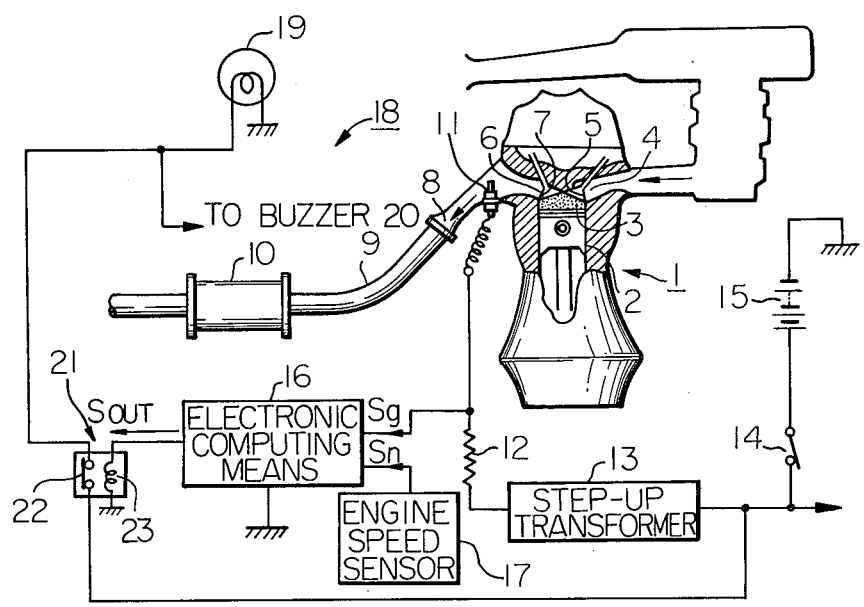
FIG. 1 is a schematic sectional view of an overall configuration of a misfiring detector for an internal combustion engine in accordance with the present invention.

Referring more particularly to FIG. 1, there is shown a misfiring detector of the present invention and an internal combustion engine, the combustion engine generally being indicated by a reference numeral 1. The engine 1 comprises four cylinders 2 each having therein a combustion chamber 3, an intake port 4 with an intake valve 5 and an exhaust port 6 with an exhaust valve 7. In the drawing, only one cylinder 2 is shown for simplicity. A reference numeral 8 designates an exhaust manifold which is connected with the exhaust port 6. The exhaust manifold 8 is further connected with an exhaust pipe 9 in which a muffler 10 is disposed. There is mounted on the exhaust manifold 8 in the vicinity of the exhaust port 6 as adjacently as possible an ionization current pulse generator or a gas current pulse generator 11 which has electrodes forming therebetween an ion-gap. The gas current pulse generator 11 is connected through a resistor 12 having a high resistance to a step-up transformer 13 which is connected through a power switch 14 to an electric d.c. power supply such as a battery 15. When the power switch 14 is closed, the gas current pulse generator 11 is biased through the step-up transformer 13 by the battery 15 at a relatively high voltage, for example 300 volts. As described above, the ion-gap of the gas current pulse generator 11 yields or produces ionization current or gas current only when a high temperature burned gas is emitted through the ion-gap from the combustion chamber 3 of the cylinder 2, that is, when no misfire occurs in the combustion chamber. It is to be noted that the ionization current or gas current does not emit sparks. The gas current pulse generator 11 produces a gas current pulse signal $Sg$ which is fed to an electronic computing means 16.

Figure 2:
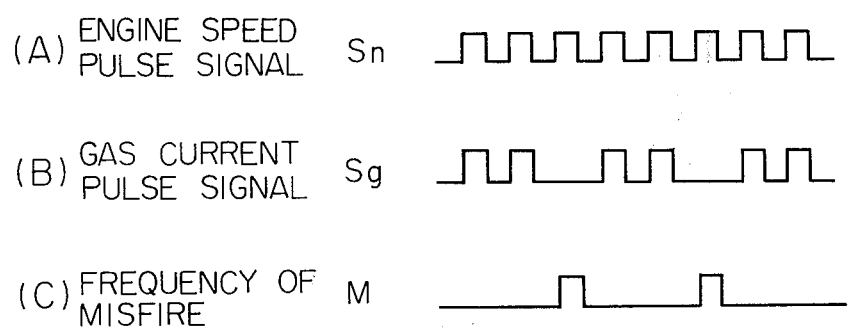
FIG. 2 is an explanatory view showing waveforms of an engine speed pulse signal, a gas current pulse signal and a pulse signal representing the frequency of misfire occurring in an internal combustion engine.

The electronic computing means 16 is further supplied with an engine speed pulse signal $Sn$ with a repetition rate proportional to the speed of the engine 1 from an engine speed sensor 17. When no misfire occurs in the combustion chamber 3, the number of the gas current pulse signal $Sg$ is proportional to that of the engine speed pulse signal $Sn$. When the electronic computing means 16 is therefore responsive to the gas current pulse signal $Sg$ and the engine speed pulse signal $Sn$, it counts the frequency in occurrence of misfire by the rate of the frequency in occurrence of misfire per unit time in relation to the number of revolution of the engine, as described above. This will be easily understood from FIG. 2. If the rate of the frequency M of misfire in the combustion chamber 3 is more than 5%, that is, the number of the gas current pulse signal $Sg$ is less than 95%, the electronic computing means 16 produces an output signal Sout representing the occurrence of misfire. The electronic computing means 16 may be of any known construction as long as it counts the frequency M in occurrence of misfire.

Further, the misfiring detector of the present invention includes an indicator for indicating the occurrence of misfire to the operator. In FIG. 1, a reference numeral 18 designates an indicator including a pilot lamp 19 and/or a buzzer 20. Both the pilot lamp 19 and the buzzer 20 are connected to an electric actuator such as a relay switch 21 comprising a relay contact 22 and a relay coil 23, as shown. When the relay switch 21 is responsive to the output signal Sout representing the occurrence of misfire from the computing means 16, the relay coil 23 is energized so that the relay contact 22 closes, resulting in the indicator 18 being actuated.

It is to be appreciated that if the relay switch 21 is of a self-holding type, it can store the misfiring condition. Further, if the electronic computing means 16 includes a self-holding circuit, it can also store the misfiring condition.

FIG. 3 illustrates some examples of waveforms of ionization currents or gas currents, in which FIGS. 3(A) and 3(B) indicate when no misfire occurs in the combustion chamber 3, that is, the air-fuel mixture is completely burned in the combustion chamber 3, while FIGS. 3(C) and 3(D) indicate when misfire occurs in the combustion chamber 3, that is, the air-fuel mixture is incompletely burned in the combustion chamber 3.

Furthermore, disclosed herein is a protective system for preventing an exhaust gas purifying means such as a catalytic converter from being destroyed by unburned gas emitted from the combustion chamber 3 of the engine 1, as shown in FIG. 4. As apparent from the drawing, the protective system for an exhaust gas purifying means utilizes the previously described misfiring detector, that is, the protective system operates and functions essentially similarly to the misfiring detector shown in FIG. 1. Accordingly, as to the misfiring detector, the specific explanations of its operation and function can be dispensed with and hence omitted for simplicity.

In FIG. 4, an exhaust system is generally designated by a reference numeral 30 which includes another exhaust pipe 31 bypassing the exhaust pipe 9 in which the muffler 10 is disposed. The exhaust gas purifying means 32 such as a catalytic converter is disposed in the exhaust pipe 31. These exhaust pipes 9 and 31 are provided with a bypass valve 33 for preventing unburned gas emitted through the exhaust manifold 8 from the combustion chamber 3 from passing through the exhaust gas purifying means 32. The bypass valve 33 is actuated by a solenoid actuator 34 which is energized by the relay switch 21 in response to the output signal Sout from the computing means 16 of the misfiring detector. In the event that a misfire occurs in the combustion chamber 3 and unburned exhaust gas is emitted through the exhaust manifold 8 from the combustion chamber 3, the unburned gas is not introduced into the exhaust pipe 31 having the exhaust gas purifying means 32 but into the exhaust pipe 9 having the muffler 10 by means of the bypass valve 33. Thus, there does not occur in the exhaust gas purifying means 32 an excessive exothermic reaction which invites such overheating as would destroy the exhaust gas purifying means 32.

On the other hand, a secondary air supply system being generally indicated by a numeral 40 is shown in FIG. 4. The secondary air supply system 40 comprises an air cleaner 41, an air pump 42 sucking a clean air filtered through the air cleaner 41, and a secondary air supplying pipe 43 with a one-way check valve 44 which introduces a secondary air from the air pump 42 into the exhaust manifold 8 through a nozzle 45. The secondary air supply system 40 further includes a bypass passageway 46 bypassing the secondary air supplying pipe 43 and a bypass valve 47 for feeding back the secondary air into the air pump through the bypass passageway 46 in a manner as to shut off the secondary air. The bypass valve 47 is actuated by a actuator 48 which is energized by the relay switch 21 in response to the output signal Sout from the computing means 16 of the misfiring detector, only when a misfire occurs in the combustion chamber 3.

It is to be appreciated that it is possible to control the opening and closing operation of the bypass valve 47 in such a manner as to adjust an amount of the secondary air introduced into the exhaust gas purifying means 32 to the extent that the exothermic reaction in the exhaust gas purifying means 32 does not destroy the exhaust gas purifying means 32 by the overheat thereof.

It is further to be appreciated that it is possible to successively actuate the bypass valve 47 by storing the misfiring condition by means of the self-holding type relay switch or the self-holding circuit of the computing means 16, as described hereinbefore.

The herein presented detailed descriptions of preferred embodiments of the present invention are for the purpose of explaining the principles thereof only, and are not to be considered as limiting or restricting the present invention, since many modifications may be made by exercise of skill in the art without departing from the scope of the present invention.

What is claimed is:

1. In an internal combustion engine having at least one combustion chamber, an exhaust system including an exhaust port opening to said combustion chamber, an exhaust manifold, two exhaust pipes connected with said exhaust manifold, and an exhaust gas purifying means disposed in one of said exhaust pipes; a protective system for preventing said exhaust gas purifying means from being destroyed by unburned gas emitted from said combustion chamber in the event that a misfire occurs in said combustion chamber, which system comprises:

a gas current pulse generator disposed in said exhaust manifold in the vicinity of said exhaust port, said gas current pulse generator having electrodes forming an ion-gap for generating gas current pulse signal when a high temperature burned gas is emitted through said ion-gap from said combustion chamber;

an engine speed sensor driven by said engine for producing an engine pulse signal with a repetition rate proportional to the speed of said engine;

an electronic computing means responsive to said gas current pulse signal and said engine speed pulse signal to produce an electric output signal representing the occurrence of the misfire when the ratio of the number of said gas current pulse signal to that of said engine speed pulse signal is less than a predetermined value;

bypass valve means disposed in said exhaust pipes for preventing said unburned gas from passing through said exhaust gas purifying means;

a solenoid actuator for actuating said bypass valve means; and electric energizing means for energizing said solenoid actuator in response to said output signal from said electronic computing means and storing a misfiring condition.

2. In an internal combustion engine as claimed in claim 1, said electric energizing means is a relay switch of a self-holding type to thereby store a misfiring condition.

3. In an internal combustion engine as claimed in claim 1, said electronic computing means includes a self-holding circuit for storing a misfiring condition.

4. In an internal combustion engine having at least one combustion chamber, an exhaust system including an exhaust port opening to said combustion chamber, an exhaust manifold and an exhaust pipe connected to said exhaust manifold, an exhaust gas purifying means disposed in said exhaust pipe, and a secondary air supply system including an air cleaner, an air pump for sucking air filtered through said air cleaner and a secondary air supplying pipe with a one-way check valve for supplying a secondary air from said air pump into said exhaust manifold through a nozzle; a protective system for preventing said exhaust gas purifying means from being destroyed by unburned gas emitted from said combustion chamber in the event that a misfire occurs in said combustion chamber comprising:

a gas current pulse generator disposed in said exhaust manifold in the vicinity of said exhaust port, said gas current pulse generator having electrodes forming an ion-gap for generating a gas current pulse signal when a high temperature burned gas is emitted through said ion-gap from said combustion chamber;

an engine speed sensor driven by said engine for producing an engine speed pulse signal with a repetition rate proportional to the speed of said engine;

an electronic computing means responsive to said gas current pulse signal and said engine speed pulse signal to produce an electric output signal representing the occurrence of the misfire when the ratio of the number of said gas current pulse signal to that of said engine speed pulse signal is less than a predetermined value;

a secondary air supply control means for preventing said secondary air from being drawn into said exhaust gas purifying means, said control means comprising a bypass valve means disposed in said secondary air supplying pipe for feeding back said secondary air into said air pump through a bypass passageway communicating between said secondary air supplying pipe and said air pump and a solenoid actuator for actuating said bypass valve means; and electric energizing means for energizing said solenoid actuator in response to said output signal from said electronic computing means and storing a misfiring condition.

5. In an internal combustion engine as claimed in claim 4, said electric energizing means is a relay switch means of a self-holding type to thereby store a misfiring condition.

6. In an internal combustion engine as claimed in claim 4, said electronic computing means includes a self-holding circuit for storing a misfiring condition.

7. In an internal combustion engine having at least one combustion chamber, an exhaust system including an exhaust port opening to said combustion chamber, an exhaust manifold and two exhaust pipes connected to said exhaust manifold, an exhaust gas purifying means disposed in one of said exhaust pipes, and a secondary air supply system including an air cleaner, an air pump for sucking air filtered through said air cleaner and a secondary air supplying pipe with a one-way check valve for supplying a secondary air from said air pump into said exhaust manifold through a nozzle; a protective system for preventing said exhaust gas purifying means from being destroyed by unburned gas emitted from said combustion chamber in the event that a misfire occurs in said combustion chamber comprising:

a gas current pulse generator disposed in said exhaust manifold in the vicinity of said exhaust port, said gas current pulse generator having electrodes forming an ion-gap for generating gas current pulse signal when a high temperature burned gas is emitted through said ion-gap from said combustion chamber;

an engine speed sensor driven by said engine producing an engine speed pulse signal with a repetition rate proportional to the speed of said engine;

an electronic computing means responsive to said gas current pulse signal and said engine speed pulse signal to produce an electric output signal representing the occurence of the misfire when the ratio of the number of said gas current pulse signal to that of said engine speed pulse signal is less than a predetermined value;

first bypass valve means disposed in said exhaust pipes for preventing said unburned gas from passing through said exhaust gas purifying means;

a first solenoid actuator for actuating said first bypass valve means;

a secondary air supply control means for preventing said secondary air from being drawn into said exhaust gas purifying means, said control means comprising a second bypass valve means disposed in said secondary air supplying pipe for feeding back said secondary air into said air pump through a bypass passageway communicating between said secondary air supplying pipe and said air pump and a second solenoid actuating said second bypass valve means; and electric energizing means for energizing said first and second solenoid actuators in response to said output signal from said electronic computing means and storing a misfiring condition.

8. In an internal combustion engine as claimed in claim 7, said electric energizing means is a relay switch means of a self-holding type to thereby store a misfiring condition.

9. In an internal combustion engine as claimed in claim 7, said electronic computing means includes a self-holding circuit for storing a misfiring condition.

* * * * *